Aug. 25, 1959  A. R. BRAULT ET AL  2,900,740
SIMULATED RADIOACTIVE RADIATION METER
Filed Aug. 21, 1953  4 Sheets-Sheet 1
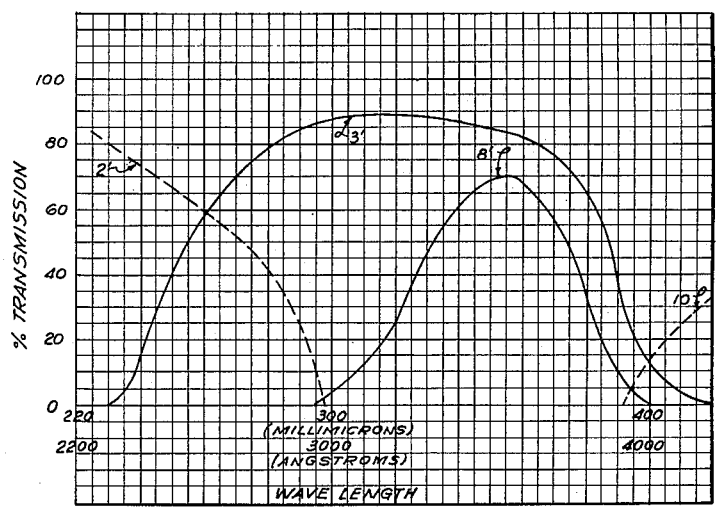
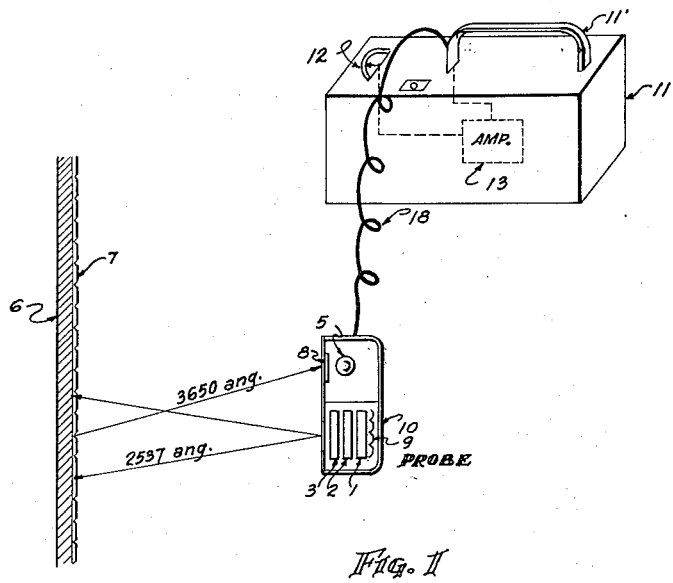
INVENTOR.
ANDRE. R. BRAULT
RALPH. LINDBERGH

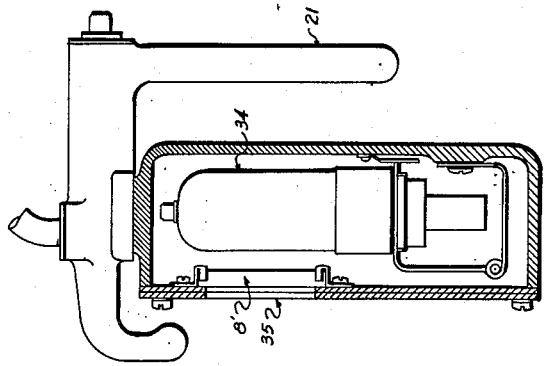
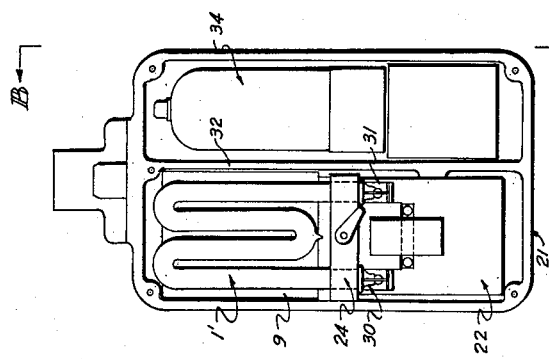
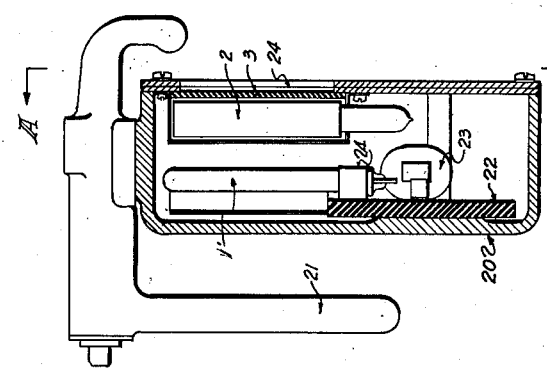

INVENTOR.
ANDRE R. BRAULT
RALPH. LINDBERGH

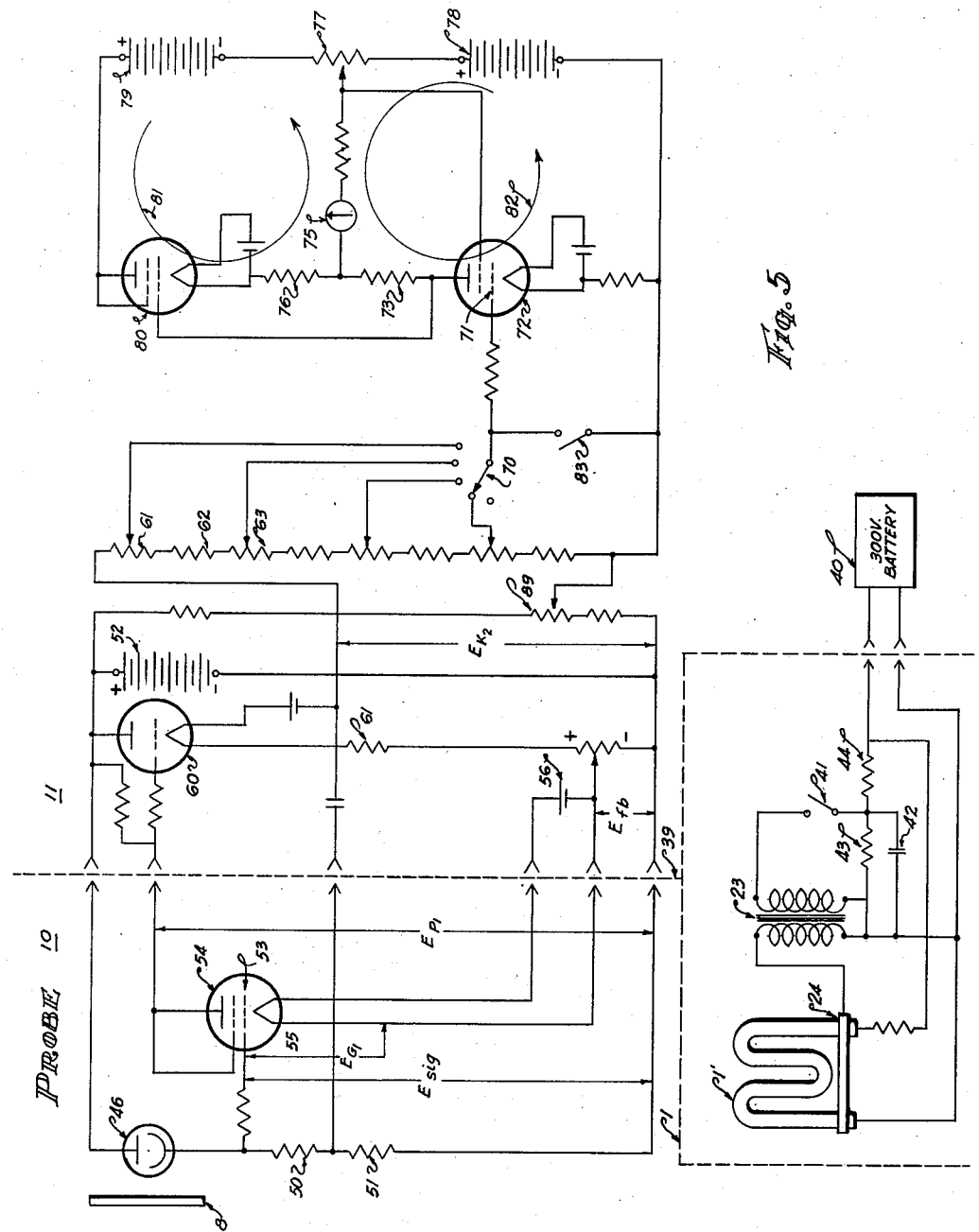

United States Patent Office 2,900,740
Patented Aug. 25, 1959

2,900,740

SIMULATED RADIOACTIVE RADIATION METER

Andre R. Brault, Merrick, and Ralph Lindberg, Malba, N.Y., assignors to OPTOmechanisms, Inc., Mineola, N.Y., a corporation of New York Application August 21, 1953, Serial No. 375,655

4 Claims. (Cl. 35—1)

This invention relates to radiation meters and more particularly, to a radiation meter system or monitor for training purposes.

The present invention detects a synthetic contaminant by giving meter deflection in the same manner as a radioactive detector meter.

More specifically, the present invention is primarily a device for training personnel to use radiation meters for detecting radioactivity without exposing of personnel to dangerous radioactive radiations. By use of the present invention, it will be possible to train personnel in radioactive detection and decontamination techniques without exposing the instructor or students to the dangerous radiation required for deflection on standard radiac meters.

The present invention simulates the actual conditions by use of wave lengths which are not harmful. The present system includes a source of radiation which activates a special phosphor which may be placed on surrounding objects or surfaces. The phosphor when energized by one wave length, radiates a different wave length which is detected by the receiver of the present invention.

More specifically, one embodiment of the present invention uses an invisible ultra-violet source of 2537 angstroms, and a phosphor which emits at 3650 angstroms when excited by the 2537 angstrom radiation. The 3650 angstrom radiation is picked up by a detector having a meter which gives deflection proportional to the strength of the radiation.

The invention may be used for various detection and identification purposes. For instance automobiles allowed to enter a factory, or restricted place could be invisibly marked on a certain portion and could be automatically checked by an embodiment of the invention installed by the gate.

Interlopers or thieves in restricted areas could be caught by sprinkling a phosphor on the floor or walls of the restricted area and installing the present invention by the main exit gate. Other police or security applications may be visualized.

The invention may also be used for laboratory use for the invisible tagging and identification of test specimens. Certain test animals, insects or specimens in a group may be marked with a phosphor and counted, detected, or identified with the present invention. The phosphors would be harmless to the animals or insects.

The invention could also be used in industry for marking certain production runs. The phosphors may be detected through any material that is transparent to ultra violet.

The efficiency of cleaning operations or of various soaps may be checked by placing some phosphors on the processed materials and checking the material with the detector of the present invention.

Various phosphors may be used as well as different frequencies. Of course suitable filters must be chosen for the frequencies used. The phosphors may be mixed with binders or adhesives suitable for the intended use. The phosphors may be mixed with water colors if it is desired.

Accordingly, a principal object of the invention is to provide new and improved simulated radiation means.

Another object of the invention provides radiation meter means for training personnel without danger.

Another object of the invention is to provide a radiation meter system adapted to simulate the conditions of radiation meters of the Geiger tube type.

Another object of the present invention is to provide a training radiation meter having a source of harmless radiation, a phosphor adapted to be activated by said radiation to reradiate a second frequency, a detector adapted to receive said second frequency, and a meter connected to said detector.

Another object of the present invention is to provide new and improved detecting means.

Another object of the present invention is to provide new and improved identification means.

Another object of the present invention is to provide new and improved detecting and identification means for scientific purposes.

Another object of the invention is to provide a training radiation meter having a source of radiation of a first frequency with appropriate filters to eliminate other frequencies, a phosphor adapted to be activated by said radiation to reradiate a second frequency and a detector adapted to receive said second frequency.

Another object of the invention is to provide a training radiation meter having a source of radiation of a first frequency with appropriate filters to eliminate other frequencies, a phosphor adapted to be activated by said radiation to reradiate a second frequency, a detector adapted to receive said second frequency, a high gain amplifier connected to said detector and a sensitive microammeter connected to said amplifier.

These and other objects of the invention will be apparent from the following specification and drawings of which:

Figure 1 is a block diagram illustrative of the invention and its operation.

Figure 2 is a group of filter characteristics used in the invention.

Figures 3, 3A and 3B are views partially in section of the probe member of the invention

Figure 5 is a schematic electrical diagram.

Figure 4:
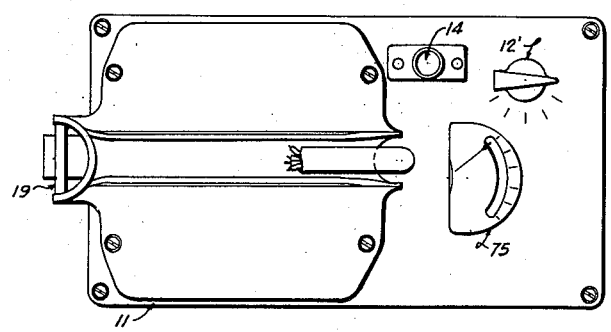
Figures 4 and 4A are outline views of the main container of the invention.

Figure 1 illustrates generally the apparatus of the present invention. The apparatus comprises a probe member 10 and a portable main member 11. The main member 11 has a handle 11' so that it may be conveniently carried in one hand by the operator and contains the indicating meter 12, amplifier 13 and power supply circuits including batteries (not shown). The probe unit 10 is relatively small and as light as possible. It is connected to the main unit 11 by means of a relatively long lead 18. The probe member 10 is carried in the other hand of the operator so that he may investigate the radiation in out of the way places such as, under tables or through apertures in a wall, etc.

Figure 1 also illustrates the principal of operation of the invention. The source 1 which may be a mercury arc, generates energy of 2537 angstroms. In front of the source 1 is placed an absorbition filter 2 which absorbs energy in the 3,000–4,000 ang. range. This filter may be a flask containing chlorine gas. The purpose of the filter 2 is to eliminate 3650 ang. energy from the source so that it will not be reflected to the receiver 5, since the receiver is responsive to that frequency as will be explained. In the front of the filter 2 is placed a glass filter 3 which may be conventional, for instance filter #9863 of the Corning Glass Co. has been used successfully. The purpose of the filter 3 is to pass energy only from 2,000 to 4,000 thereby eliminating visible light from the source. A reflector 9 is preferably provided behind the source 1.

The primary 2537 ang. energy impinges on an object 6 which is coated with a phosphor 7. The phosphor has the property of reradiating a different frequency, in this case, 3650 ang. The 3650 ang. radiation is picked up by the receiver 5 and indicated on the meter 12 as will be more fully explained. In front of the receiver 5 is placed a band pass filter 8, which is adapted to pass the 3650 ang. radiation and to eliminate other frequency bands. A barium di-silicate phosphor such as Westinghouse BL-360 has been successfully used.

Figure 2 is a group of graphs showing the filter characteristics in percent transmission against wave length in angstroms. The dotted line 2' shows the transmission curve of the chlorine gas filter 2. This filter absorbs the radiation between approximately 3,000 ang. and 4,000 ang. to thereby eliminate any 3650 ang. radiation in the source and its direct reflection. The characteristic of the filter 3 is shown by the curve 3'. This filter passes the radiation from approximately 2,000 to 4,000 ang. but eliminates visible light which might cause an ambiguity in the training operation. The characteristic of the filter 8 as shown by the curve 8' which passes radiation from approximately 3,000 to 4,000 ang. thereby rejecting any direct reflection of the transmitted 2537 ang. radiation.

Figure 3 shows a side sectional view of the probe unit, and Figure 3A shows a section parallel to the front plane along the lines A—A of Figure 3. Figure 3B shows a right side sectional view of the probe taken along the lines B—B of Fig. 3A. Referring to these figures, the probe comprises a casing 20 approximately 6" high 3" wide and 2½" deep. It has a handle 21 connected to the top so that the operator may conveniently carry it.

Figure 3A is a sectional view along the line A—A of Figure 3 and it shows the source 1' which may be a mercury arc tube having a M shaped configuration. It has 2 contacts 30 and 31 at its extremities. The mercury tube 1' is mounted in front of reflector 9 on a block of insulation 22, Figure 3, which is connected to the case 20. The reflector may be of polished metal such as "Alzak" aluminum reflector. A starting coil 23 is also mounted on the insulation block 22 as well as a starting electrode 24. The starting coil and electrode are for initiating the arc in the mercury tube 1' in conventional manner as will be more fully explained in connection with the schematic circuit diagram of Figure 5. The chlorine gas filter 2 is mounted in front of the source 1' (Figure 3) and the glass filter 3 is mounted in front of the filter 2 and a plain glass window 24 is connected to the case in front of the filters.

Referring again to Figure 3A, the case 21 has a partition 32 down its length near the center line. The partition 32 separates the source 1' from the receiver detector 34. Figure 3B illustrates the filter 8' which is placed in front of the detector and window 35 in front of the filter 8'. The space under the detector 34 may be utilized for one stage of amplification (not shown) if desired.

Figure 4A:
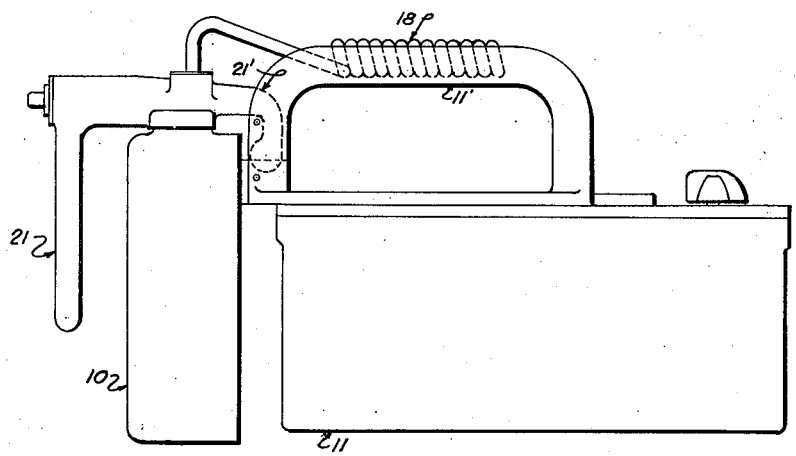

Figures 4 and 4A show top and side views of the main carrying case 11. The handle 11' is connected to the top of the case and the probe 10 may be hung onto the case 11 by means of the hook 21' of the handle 21 which engages the holding bar 19 of the case 11. The handle 11 is semi-cylindrical in structure and is adapted to contain the lead wire 18, when the probe 10 is hung onto the unit 11 as shown. The lead wire 18 is of the type having a coil spring incorporated therein so that it will naturally and conveniently fit inside the handle 11' as shown.

The top of the case 11 contains the meter 12, a meter range switch 12', and push button starting switch 41.

Figure 5 shows the schematic diagram of the electrical circuits of the probe 10 and main unit 11 which are separated by the dotted line 39. The source 1 comprises the mercury arc tube 1' connected to the starting coil 23. The power for the mercury tube is supplied by the battery 40 which is contained in the main unit 11. The battery is connected to the starting coils through a resistor-condenser network and the switch 41. The condenser 42 will normally charge up to a voltage determined by the battery voltage and the voltage divider action of the resistors 43 and 44. When the switch 41 is closed, the condenser will discharge through the primary of the starting transformer 23. The secondary coil of transformer 23 has a very large number of turns so that a very large voltage will be applied to the electrode bar 24 which will be sufficient to initiate the arc in the tube 1'. The resistor 45 is merely a current limiting resistor.

The receiver of the probe 10 comprises a photo cell 46 which may be for instance, a conventional photo tube type 935. The photo tube is connected in series with resistors 50 and 51 and a 45 volt battery 52. The output of the photo tube is taken across resistors 50 and 51 and applied to the grid 53 of amplifier tube 54. The cathode 55 of tube 54 is energized by a 1.25 volt battery 56. The output of the amplifier 54 is connected to a cathode follower stage 60, the output of which is taken across cathode resistor 61 and applied to the meter circuits.

The amplifier 54 and cathode follower 60 incorporate a feed back circuit which provides a very high gain.

The positive feed back circuit operates as follows, where

E sig is the input,
$E_{g1}$ is the voltage on the grid of tube 54, and
$E_{fb}$ is the feed back voltage $$E_{g1} = E\text{ sig} + E_{fb}$$

An increase of E sig tends to increase $E_{g1}$ which decreases the plate voltage $E_{p1}$ which is connected to the gride of tube 60. Therefore, the grid and cathode voltage $E_{k2}$ of tube 60 are decreased thereby decreasing the feed back voltage $E_{fb}$.

This tends to make the grid of tube 54 less negative thereby providing a positive feed back effect which provides a very high gain.

The meter circuits comprise a conventional microammeter in a bridge circuit together with suitable range switching circuits. The output from the cathode follower 60 is connected across a number of series resistors and potentiometers 61, 62, 63, etc. The potentiometer taps are connected to taps on the meter range switch 70. The meter and range switch may be calibrated in an arbitrary manner preferably in milli-roentgens. The output of the range switching circuits are connected to the grid 71 of an amplifier 72. The plate of the amplifier 72 is connected through resistor 73 to the microammeter 75 and also through resistor 76 to the cathode of second amplifier tube 80. The voltage supplies to the tubes 72 and 80 are provided by the two volt batteries 78 and 79. The two batteries are joined by a potentiometer 77, the tap of which is connected to one side of the meter 75.

It will be noted that there are two opposing circuits through the meter 75 as shown by the arrows 81 and 82. These two currents circulate in opposite halves of a conventional bridge type circuit and provide means for accurately zeroing the meter. The meter is zeroed by closing the zero switch 83 and adjusting the zero potentiometer 77 to zero meter 75. Once the circuit is zeroed, the switch 83 is left open. Then, cover photocell to eliminate light and adjust potentiometer 89 to zero meter. This will establish zero level of extraneous light. The operation is as follows:

When a signal is received by the photo tube 46, it is amplified and applied through the meter switching circuits to the grid 71 of the tube 72, thereby increasing the current 82 through the tube 72 and providing a suitable reading on the meter 75 proportional to the amount of radiation received by the photo tube 64. At the same time that the current 82 increases the current 81 will decrease, since the plate voltage of tube 72 is connected to the grid of tube 80. If the current 82 increases, the plate voltage of tube 72 and therefore the grid voltage of tube 80 will decrease thereby decreasing the current 81. This makes the meter very sensitive.

The invention has been illustrated with the use of wave lengths in the ultra violet range. However, infra red, gamma, or X-ray wave lengths could be used without departing from the scope of the invention. In such use suitable phosphors, filters, generators and detectors would be chosen for the wave length used.

We claim:

1. A safe process of training operators to detect radioactivity comprising the steps of, painting objects with a contaminant responsive to radiated energy and adapted to re-radiate energy, transmitting energy having a first identifiable characteristic and detecting energy re-radiated from said contaminant.

2. A safe process of training operators to detect radioactivity comprising the steps of, painting objects with a contaminant responsive to radiated energy having a first identifiable characteristic and adapted to re-radiate energy having a second identifiable characteristic, transmitting energy having said first identifiable characteristic and detecting said energy re-radiated from said contaminant.

3. A safe process of training operators to detect radioactivity comprising the steps of, coating objects with a contaminant responsive to first frequency radiated energy and adapted to re-radiate second frequency energy, transmitting energy having said first frequency and detecting energy re-radiated from said contaminant.

4. Safe training radiation search means comprising a portable source of radiation of a first frequency and a detector adapted to receive a second frequency, a harmless phosphor coated on objects remotely located and adapted to be irradiated by said first frequency and adapted to reradiate said second frequency in response thereto.

References Cited in the file of this patent

UNITED STATES PATENTS

| | | |
|---|---|---|
| 1,963,185 | Wilson | June 19, 1934 |
| 2,082,934 | Anderson et al. | June 8, 1937 |
| 2,355,258 | Biggs et al. | Aug. 8, 1944 |
| 2,470,449 | Williams | May 17, 1949 |
| 2,485,418 | Taylor | Oct. 18, 1949 |
| 2,505,793 | Rust | May 2, 1950 |
| 2,551,542 | Marsh et al. | May 1, 1951 |

OTHER REFERENCES

"New Ultraviolet Phosphors," Froelich, The Electrochemical Society Preprint 91–11, pages 161–163.